United States Patent
Wright et al.

(10) Patent No.: US 6,901,606 B2
(45) Date of Patent: May 31, 2005

(54) METHOD AND APPARATUS FOR DETECTING TIME-COMPRESSED BROADCAST CONTENT

(75) Inventors: David H. Wright, Safety Harbor, FL (US); Marie Philippe, Tarpon Springs, FL (US)

(73) Assignee: Nielsen Media Research, Inc., New York, NY (US)

( * ) Notice: Subject to any disclaimer, the term of this patent is extended or adjusted under 35 U.S.C. 154(b) by 16 days.

(21) Appl. No.: 10/442,411

(22) Filed: May 20, 2003

(65) Prior Publication Data

US 2005/0010944 A1 Jan. 13, 2005

(51) Int. Cl.[7] .............................................. H04N 7/16
(52) U.S. Cl. ........................ 725/151; 725/22; 725/32
(58) Field of Search .............................. 725/107, 100, 725/131–134, 139–142, 22, 32, 34–36, 151, 152–153; 348/192–193, 518; 386/1, 33, 83, 111–112; 375/240.26, 240.25

(56) References Cited

U.S. PATENT DOCUMENTS

| | | | |
|---|---|---|---|
| 4,843,562 A | * | 6/1989 | Kenyon et al. ............... 725/22 |
| 5,319,453 A | | 6/1994 | Copriviza et al. |
| 5,355,161 A | | 10/1994 | Bird et al. |
| 5,557,334 A | | 9/1996 | Legate |
| 5,646,675 A | | 7/1997 | Copriviza et al. |
| 5,677,980 A | * | 10/1997 | Naoe ........................... 386/109 |
| 5,930,451 A | * | 7/1999 | Ejiri .............................. 386/98 |
| 6,574,594 B2 | * | 6/2003 | Pitman et al. ................. 725/22 |
| 2003/0190139 A1 | * | 10/2003 | Ishiguro et al. ............... 386/46 |

* cited by examiner

Primary Examiner—John Miller
Assistant Examiner—John Manning
(74) Attorney, Agent, or Firm—Hanley, Flight & Zimmerman, LLC

(57) ABSTRACT

A method and apparatus for detecting time compression of broadcast content that has been encoded with time data, includes a processor for comparing encoded time data with broadcast time data to determine whether the content has been time compressed. The method and apparatus additionally detect commercial advertisements inserted between segments and exclude when detecting time compression of the content.

11 Claims, 7 Drawing Sheets

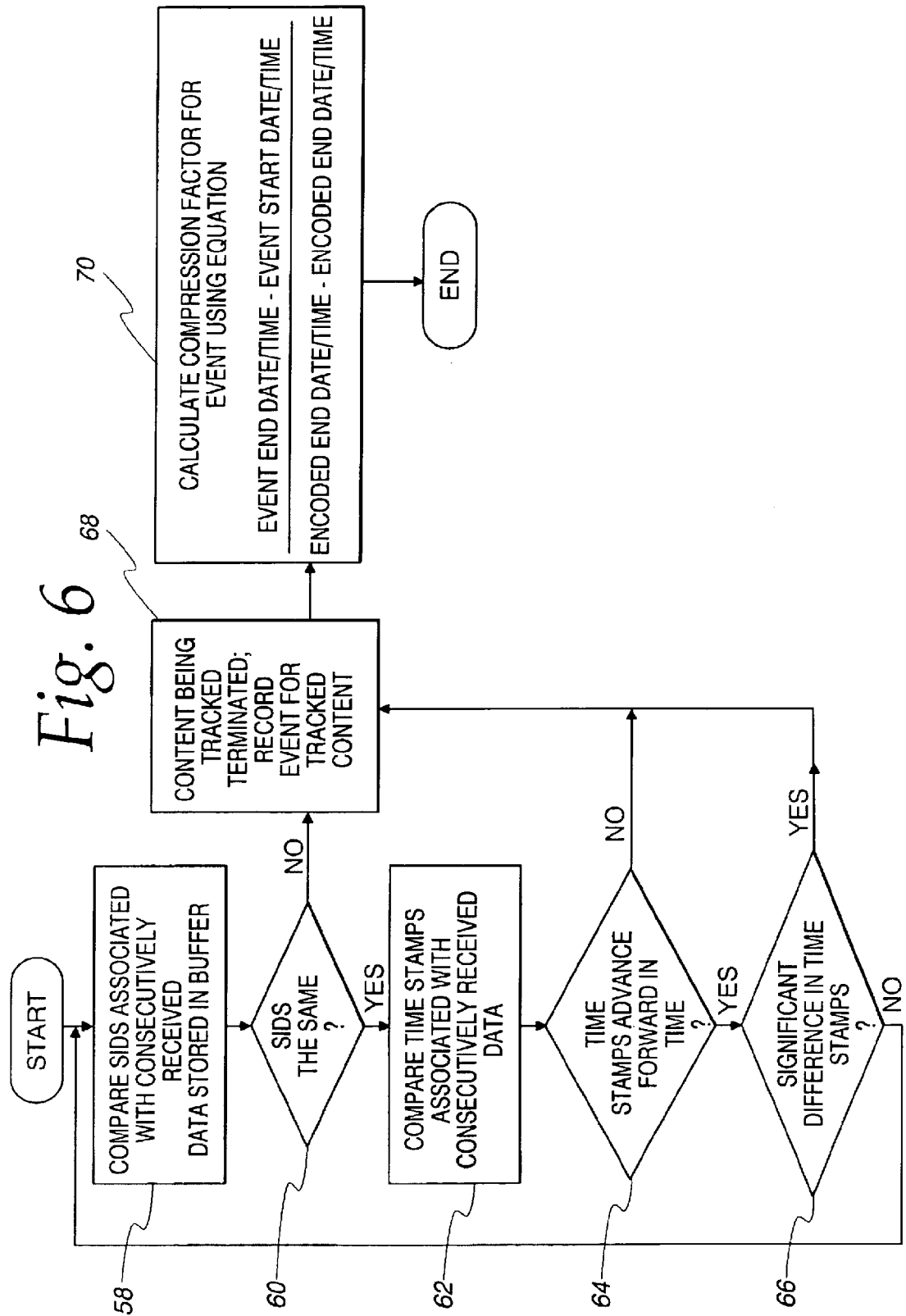

Fig. 7b
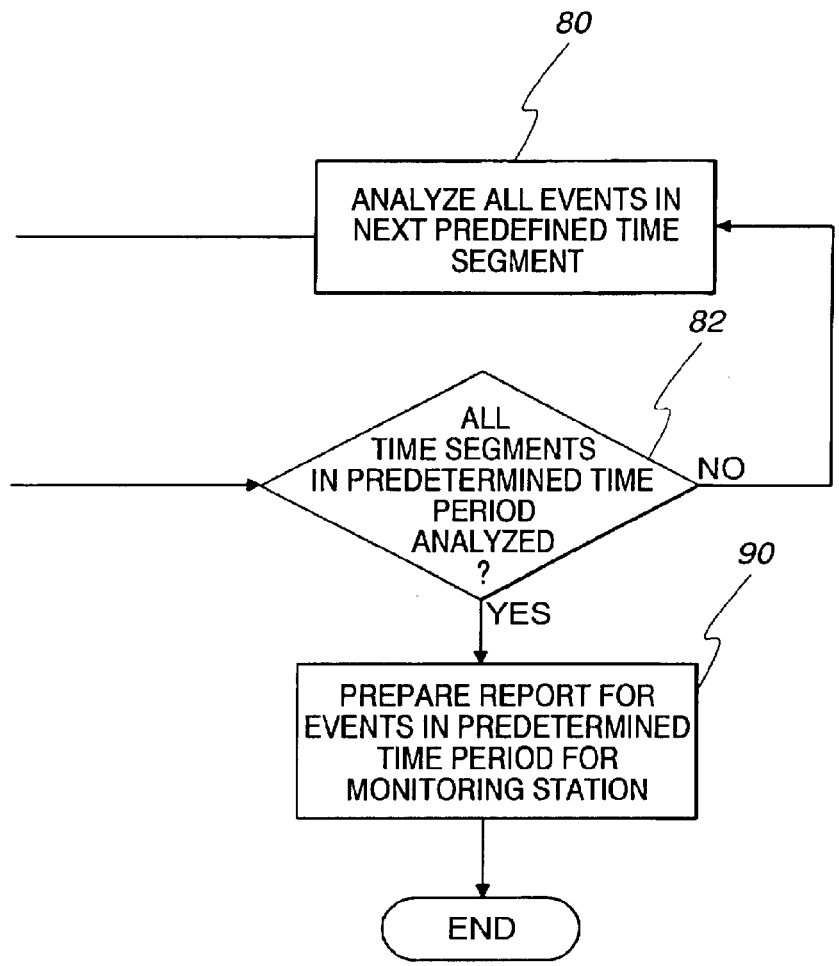
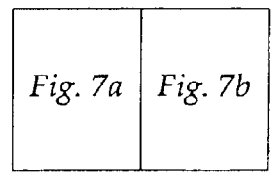

METHOD AND APPARATUS FOR DETECTING TIME-COMPRESSED BROADCAST CONTENT

BACKGROUND OF THE INVENTION

The present invention generally relates to monitoring of broadcast signals, and more particularly to detection of time-compressed broadcast content.

Accurate information about broadcast of television content such as programs, commercials, infomercials, etc., by television stations is obtained for a variety of reasons, including, creating a record by which content owners may bill television stations for use of their content, for purposes of generating ratings data and for purposes of verifying that local stations broadcast content provided by their national affiliates. Syndication houses, for example, create television programs for distribution to television stations for broadcast in exchange for a usage fee.

To track broadcast television content, content owners often use commercially available encoders to insert a unique source identifier (SID) and a date and time stamp into the content before providing the content to television stations. When broadcasted, the encoded content is received by a monitoring station that monitors broadcast signals in the broadcast areas of interest. The monitoring station detects and decodes the SID and date/time stamp inserted in the content, and uses this information to uniquely identify the content and determine the number of times that the content has been broadcasted in the broadcast area where the monitoring station is situated. This information is reported to the content owners, to be used in reconciling payments owed by the television stations to the content owners. This information is also reported to the national networks to verify that local stations broadcast national content supplied by the national networks, and may additionally be used to identify programs for purposes of generating television ratings.

Recently, some television broadcasters have been "time compressing" television content to reduce the length of the content time. Time compression is not discernable to the television audience, can be easily performed using commercially available time compression devices, and generally involves periodically removing video frames from the recorded content and adjusting the audio, thereby reducing the time required to broadcast it. For example, a thirty minute program might be reduced, i.e., time compressed, by thirty seconds to enable the broadcaster to add an additional commercial in that thirty second period, thereby generating additional revenue from the commercial time. Unfortunately, time compression is not detectable by existing broadcast signal monitoring systems such that content owners have no way of knowing whether their content has been broadcast in a compressed or uncompressed format.

BRIEF DESCRIPTION OF THE DRAWINGS

FIG. 6 is a flowchart describing a method for calculating a compression factor which is used in detecting time compression.

DETAILED DESCRIPTION OF THE INVENTION

Figure 1:
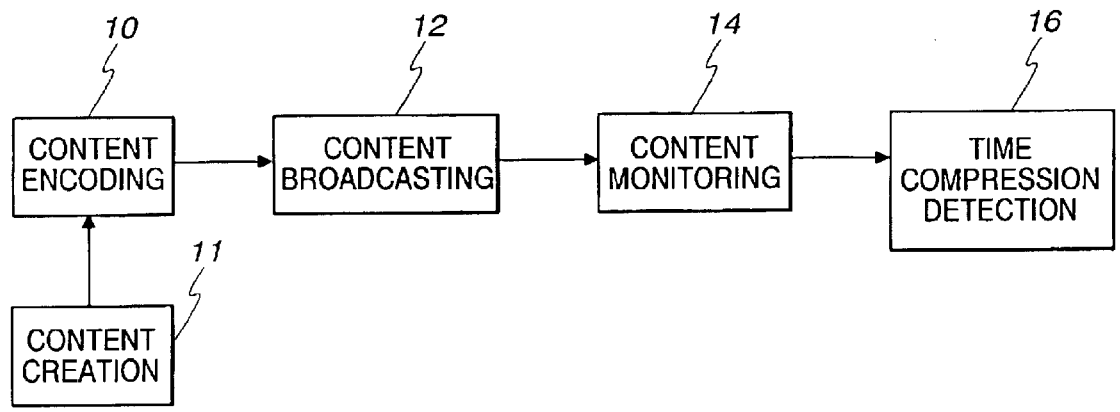
FIG. 1 is a block diagram of a system for detecting time-compressed content in accordance with one embodiment of the present invention.

Turning now to FIG. 1, a system for detecting time-compressed content in accordance with one embodiment of the present invention generally includes a content encoding stage 10 for encoding content previously created in a content creation stage 11, a content broadcasting stage 12 for broadcasting the encoded content, a content monitoring stage 14 for receiving the broadcasted encoded content, and a time compression detection stage 16 for determining whether the encoded content has been time compressed.

Figure 2:
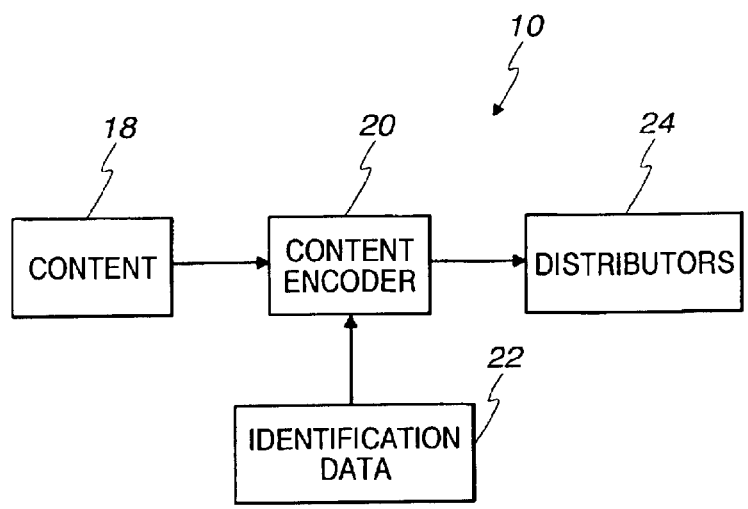
FIG. 2 is a block diagram illustrating a system for encoding identification data into content prior to broadcast of the content.

In FIG. 2, content 18 such as a national program, commercial, a syndicated program, a local program, an infomercial, etc., to be encoded by, for example, national TV networks, commercial creators or program syndicators, is supplied to an encoder 20, which may be implemented using a commercial encoder such as, for example, the Nielsen Audio/Video Encoder (NAVE) encoder developed by Nielsen Media Research, Inc. In one embodiment, the encoder 20 is implemented using an encoder described in U.S. Pat. No. 6,272,176, which is commonly assigned to Nielsen Media Research, Inc. and incorporated by reference herein in its entirety. The encoder 20 is adapted to insert identification data 22 into the "vertical blanking intervals" (VBI) of the content 18 in a manner such that the encoded identification data cannot be detected by the television audience. Those having ordinary skill in the art will recognize that VBI is a gap between two video images in an analog television signal.

Preferably, the identification data 22 is digitally encoded in the VBI of the content 18 at a rate of approximately 1 or 2 Mbit/sec, for example, and includes at least a unique source identifier (SID), a date and a time stamp. Information used for various other purposes may also be included in the identification data 22 including, for example, unique content identification codes, encoder serial numbers, etc. The encoded content 18 is then supplied to television distributors 24 for transmission to local broadcasting or television stations 26 (best shown in FIG. 3) which broadcast the encoded content to television receivers (not shown) located within the transmission signal reach of the television stations 26.

Figure 3:
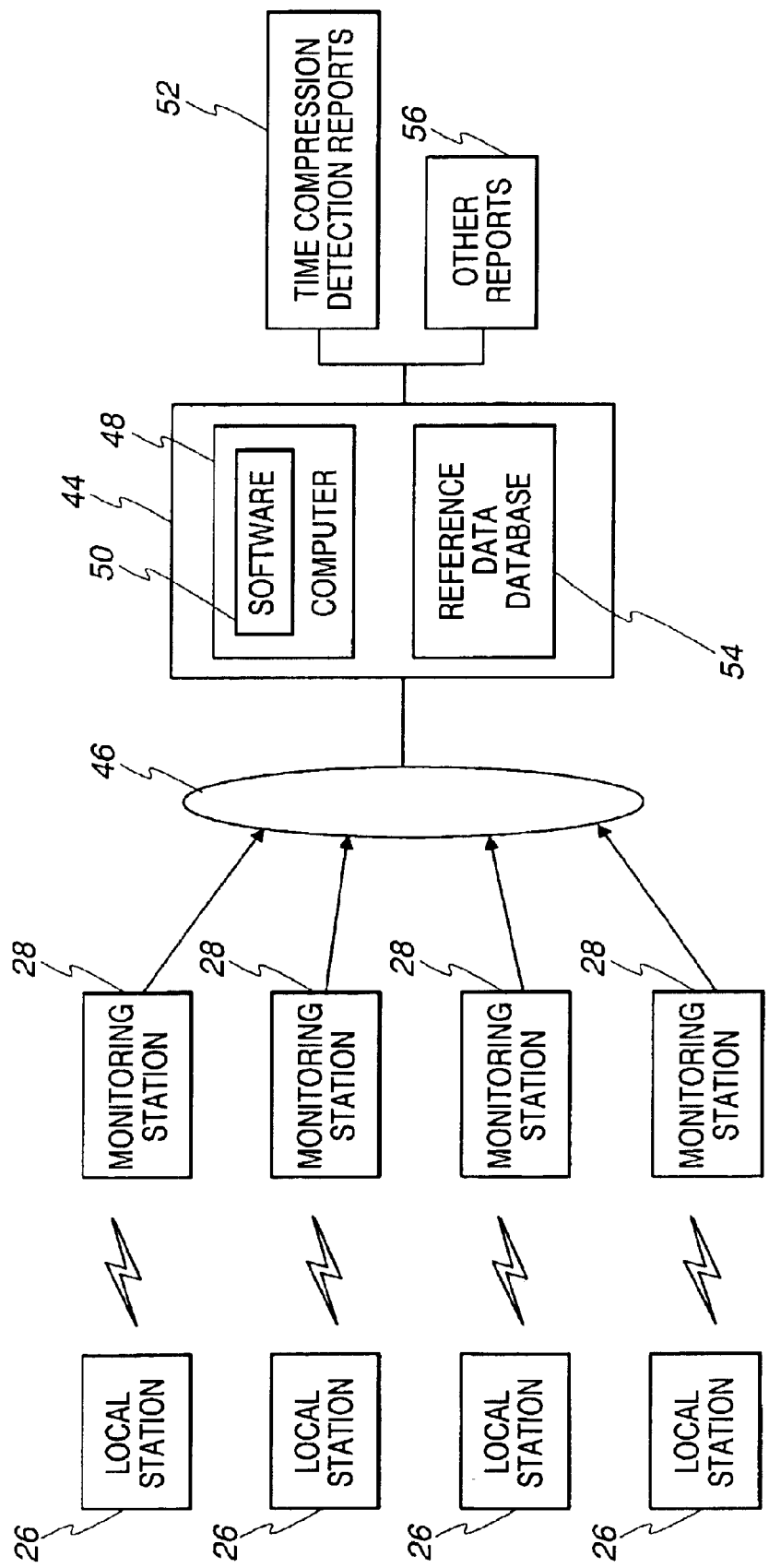
FIG. 3 is a block diagram generally illustrating broadcast monitoring stations and a collection facility in accordance with one embodiment of the present invention.
Figure 4:
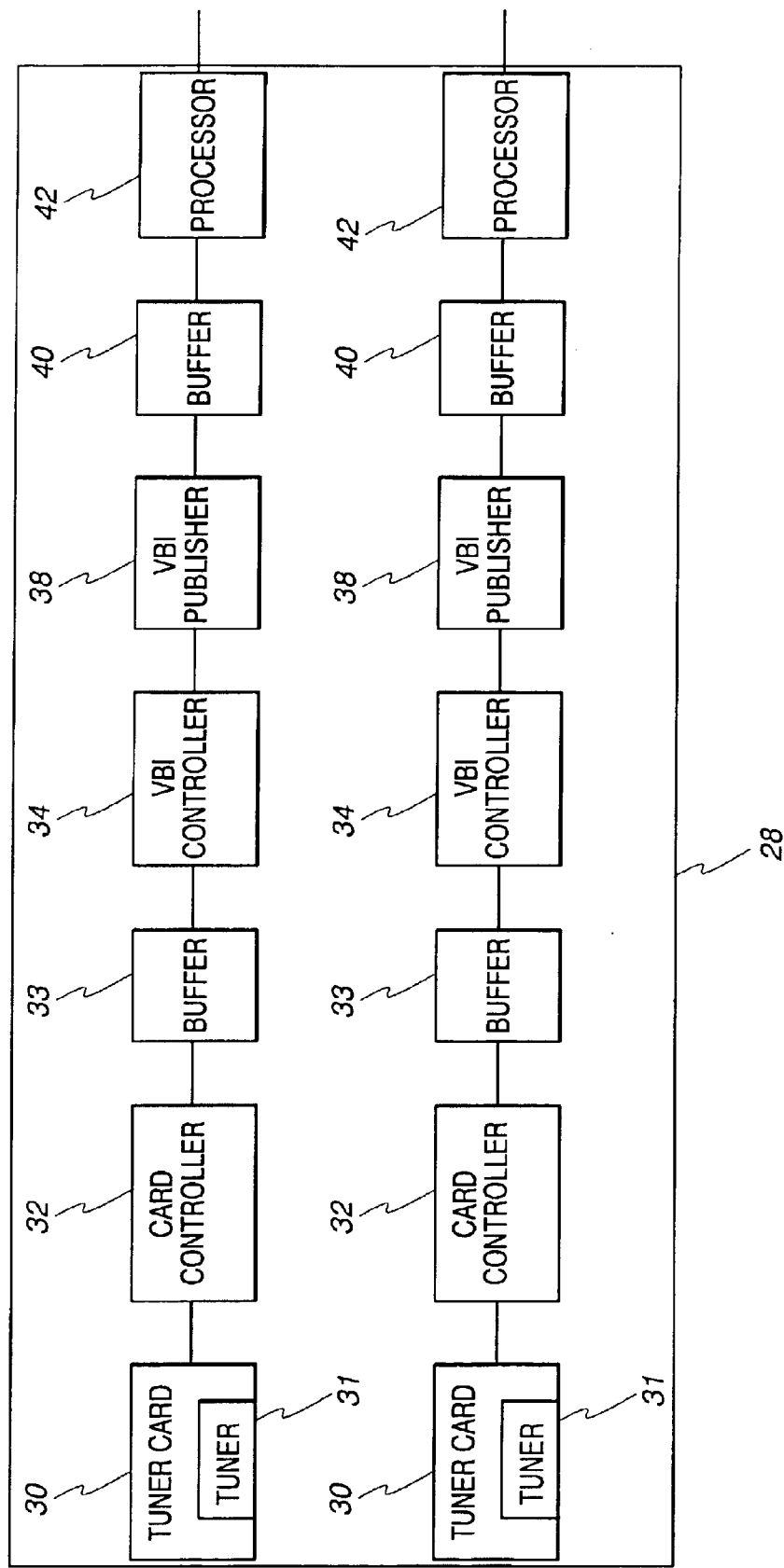
FIG. 4 is a block diagram showing an embodiment of the broadcast monitoring station of FIG. 3.
Figure 5:
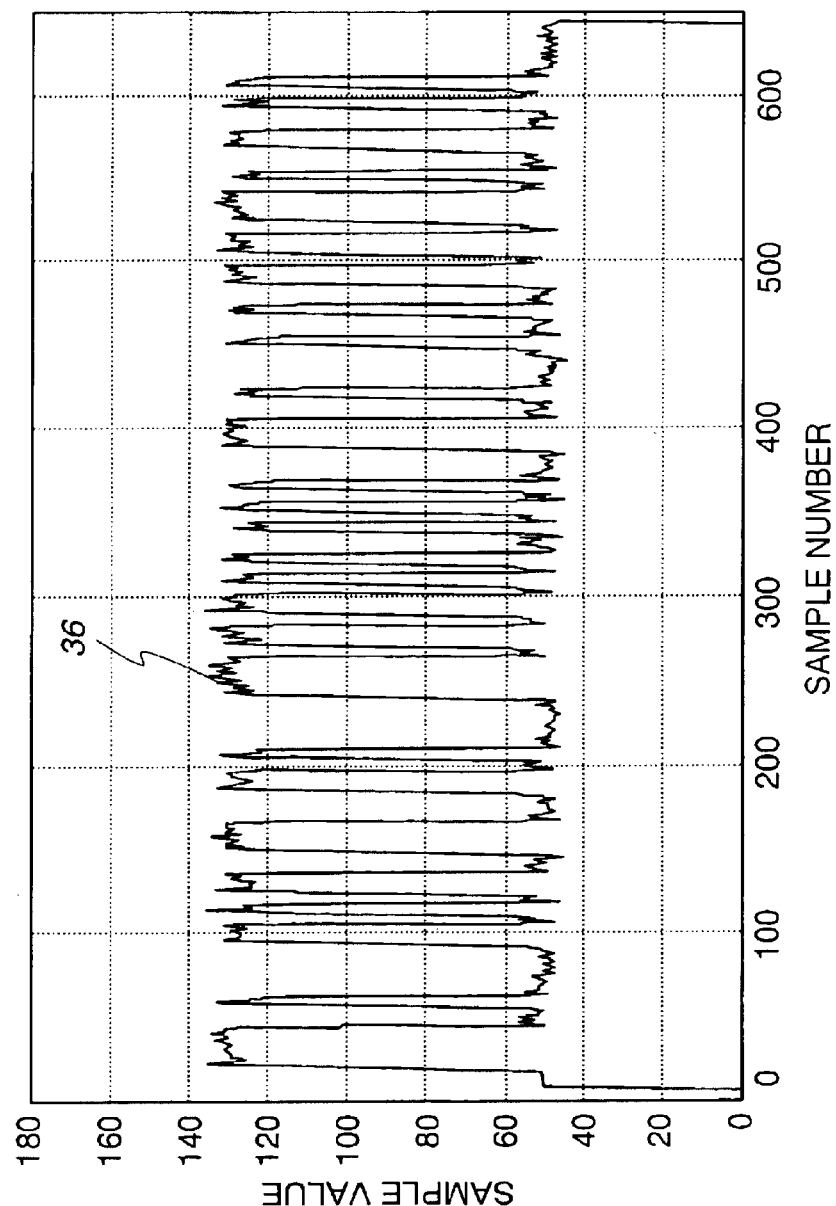
FIG. 5 is a sample of a VBI waveform representing data encoded in the VBI which is extracted at the broadcast monitoring station.

Referring to FIGS. 3 and 4, the broadcast stations 26 broadcast the encoded content 18 "over-the-air", to their respective areas of coverage, where the content is received by monitoring stations 28 located in those areas. Content may also be distributed nationally or locally via satellite or cable systems. The monitoring stations 28 include a number of tuner cards 30 (two shown in FIG. 4), each of which are adapted to receive television signals broadcast by a television broadcast station 26 in the local area. Each tuner card 30 includes a tuner 31 which is preferably implemented as hardware or firmware and provided on tuner cards for tuning to signals from a selected broadcast station 26. A card controller 32 tunes each tuner 31 to a frequency corresponding to the television signals of a particular broadcast station 26 of interest in the local area, and extracts raw data encoded in the VBI fields of the content 18 carried by the broadcast signals received by the tuner cards 30. In the preferred embodiments, the card controller 32 delivers the raw data from the VBI fields of the received television signals to a buffer 33 in the form of raw 8-bit samples, at a rate of approximately 28 million samples per second. Since each sample is 8 bits, each sample has 256 possible values. These samples represent an analog waveform 36 in international radio engineer (IRE) units. An example of a typical waveform 36 is shown in FIG. 5.

A VBI controller 34 converts the waveform 36 in the buffer 33 to a series of bits of ones and zeros, and compares the first few bits known as the start of message (SOM) to determine whether these bits match a predetermined bit sequence. A match indicates whether the waveform 36 contains data which is being monitored. The subsequent portion of the waveform following the SOM is the data region, which is analyzed to extract the data that was encoded in the VBI fields, specifically, the SID and the encoded date/time contained in the identification data 22 and other ancillary data mentioned above. The exact date/time of when this data was received may then be attached to the extracted data.

As the data encoded in the series VBI fields of television signals are extracted, the VBI controller 34 creates sets of data including the SID, the encoded date/time and the time the encoded data is received. The data sets are then transferred by a VBI publisher 38 to a buffer 40, which is accessed by a processor 42 that calculates a set of compression factors associated with the data sets (which are described in greater detail below). As discussed below, compression factors are interpreted at a central data collection facility 44 to determine whether time compression has occurred. In one embodiment, the processor 42 is programmed to perform the function of calculating compression factors using software instructions stored in the memory of the processor 42. However, any combination of software, firmware or hardware may also be employed as alternatives.

The monitoring stations 28 communicate information derived from the encoded content 18 including compression factors to the central data collection facility 44. In one embodiment, information from the monitoring stations 28 is transmitted via a plurality of modems (not shown) to a modem pool 46 and then to the collection facility 44. It should be recognized, however, that any other means may be used to communicate information from the monitoring stations 28 to the collection facility 44, including, for example, ISDN lines, cable modems, DSL lines, standard Ethernet, leased communication lines (e.g. T1) or cellular phone communication.

The data collection facility 44 includes a computer or processor 48 for executing a software program 50 for analyzing data received from the monitoring stations 28 and generating reports 52 indicating whether time compression has occurred on the encoded content 18 (described in more detail below). Instead of a software program 50, the computer 48 may include dedicated firmware or hardware, or any combination of firmware, hardware and software, designed to perform all or a portion of the data analysis and report generating functions described below. A reference data database 54 in the data collection facility 44 stores all data collected from the monitoring stations 28 for use in analyzing and preparing reports by the computer 48. Other reports 56 such as verification of programs, commercial and infomercial occurrences, video news release occurrences, etc., may be generated from the information received from the monitoring stations 28, and provided to the content owners for a variety of purposes.

Referring now to FIG. 6, a "compression factor" is calculated by the processor 42 in the monitoring station 28 which retrieves the sets of data stored in the buffer 40 and compares the SID associated with each set of data (block 58) to the SD associated with subsequently, consecutively received sets of data to determine whether the SIDs associated with consecutively received data sets are the same (block 60). If the SIDs are the same, the processor 42 compares the time stamps associated with the consecutively received data (block 62) to determine whether the time stamps continue to advance forward in time (block 64). If so, the processor 42 examines the data to determine whether there is a significant difference in the increasing time stamps of the consecutively received data (block 66), for example, greater than a ten (10) second difference. If there is no significant difference in the time stamps, and the time stamp did not jump backwards in time, the processor 42 continues to compare the SIDs associated with consecutively received data stored in the buffer 40.

Consecutively received SIDs that are different (block 60), or are the same but that are associated with time stamps that do not advance forward in time (block 64) or differ significantly (block 66), indicate that the content associated with this data has changed from a first content to a second content. Accordingly, when any of these conditions are met, the first content 18 has terminated and the data collected in association with monitoring of the first content is recorded as an "event" (block 68). Information associated with the event such as the SID, the date and the time at which the event started, i.e., the date and time at which monitoring of the first content began, and the date and the time at which the event ended, along with the encoded date and time extracted at the beginning of the event and the encoded date and time extracted at the end of the event are also recorded with the event.

Once an event has been created, a compression factor is calculated using the following equation (block 70):

$$\text{Compression Factor} = \frac{\text{Event End Date/Time} - \text{Event Start Date/Time}}{\text{Encoded End Date/Time} - \text{Encoded Start Date/Time}} \quad (1)$$

If the first content has not been time compressed, the compression factor will be approximately 1.0 because the difference between the event end date/time and the event start date/time (i.e., the numerator of equation (1)), and the difference between the encoded end date/time and the encoded start date/time (i.e., the denominator of equation (1)) will be approximately the same. If, instead, the first content has been time compressed, the duration of the event will be shorter than the duration between the encoded end date/time and the encoded start date/time. Accordingly, the compression factor will be less than 1.0. The content 18, for example, compressed by 5% will yield a compression factor of 0.95.

Television content is generally recorded in blocks of 30 minutes, 60 minutes, or more depending on the content. Typically, a local broadcast station 26 will divide each block of programming into a number of segments and insert commercials between the segments. The commercials inserted between these segments are typically 2, 3 or 4 minutes in duration and are not necessarily encoded with an SID. Each of these 2, 3 or 4 minute segments, when monitored are counted and recorded as an individual event. As a result, a monitoring system 28 monitoring a typical thirty or sixty minute program detects commercial advertisements as a series of 2, 3 and/or 4 minute events that are not encoded with SIDs and that are inserted between a set of events that represent segments of the thirty or sixty minute program. To determine whether programming content has been time compressed, the computer 48 in the data collection facility 44 may be adapted to process every event and all event-associated information collected and recorded for each program. As described above, events associated with the same program will have the same SID such that events associated with the same program may be identified by examining the SID recorded for each event. As will be appreciated by one having ordinary skill in the art, commercial advertisements, though described above as spanning 2, 3, or 4 minutes, may span any length of time.

Figure 7A:
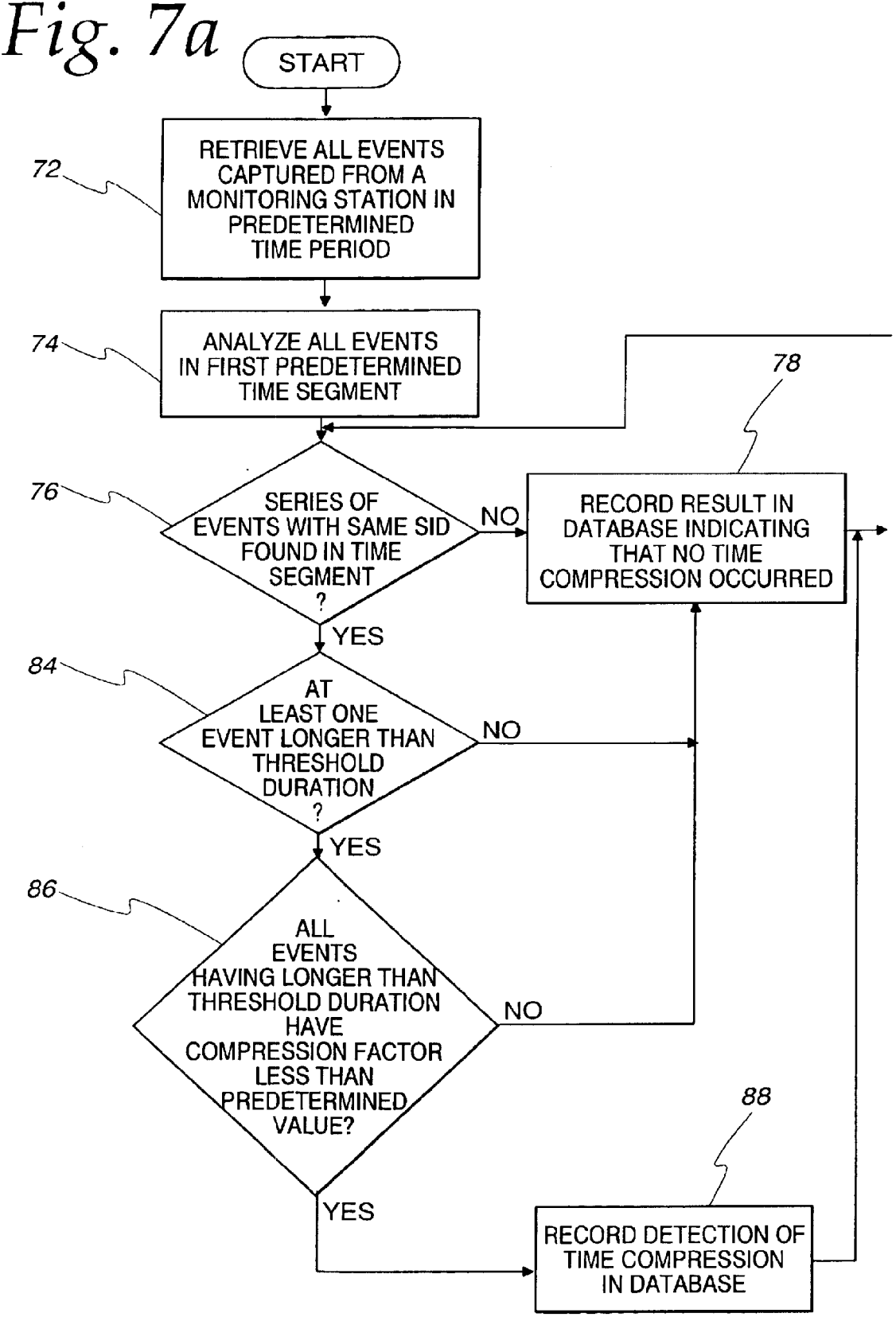
FIG. 7 is a flowchart describing a method for detecting time compression using a compression factor obtained as described in FIG. 6.

As shown in FIG. 7, detection of time compression of content starts with the computer 48 retrieving from the database 54 all events captured from a particular monitoring station 28 in a predetermined time period, for example, a one day period (block 72). From these, all events occurring within a first predefined time segment (for example, a thirty-minute segment) are analyzed (block 74) by the computer 48 to determine whether a series of events have been detected, the series of events having the same SID (block 76), and having encoded date/times that progress forward logically but that do not include timestamps that jump more than, for example, ten seconds forward (>10 second). If no such series is detected, the computer 48 interprets this to mean that no time compression can be detected and the result is recorded in the database 54 (block 78).

Events associated with the next, consecutive time segment are then analyzed (block 80), provided that additional events remain in the predetermined time period. (block 83). If, however, a series of events having the characteristics described above is detected the computer 48 determines whether at least one event in the series is longer than a threshold duration of, for example 60 seconds, (block 84). Although the duration of an event is generally expected to be significantly longer than 60 seconds (typically several minutes long as described above), events may, in some instances, be unintentionally shortened due to poor signal quality and reception problems that cause unintended gaps to occur in what would otherwise be a single, continuous event. Because the presence of these gaps may be unrelated to time compression and because it is difficult to accurately detect time compression of the programming associated with such shortened events, the computer 48 ensures that such shortened events are not analyzed via block 84. In the preferred embodiment, the threshold time duration is set at approximately 60 seconds. It should be understood, however, that the threshold can be set to a shorter or a longer time.

If none of the events in the series is equal to or longer than the threshold duration, the computer 48 determines that time compression cannot be reliably detected and records this result in the database 54 (block 78). The next predefined time segment is then analyzed (block 80), provided that additional events remain in the predetermined time period (block 82). If, instead, one or more events in the series is equal to or exceeds the threshold duration, the compression factor associated with each such event is examined to determine whether the programming associated with each such event was subjected to time compression. Specifically, to detect time compression, the computer 48 compares the compression factor calculated for each such event to a predetermined value of, for example, 0.99 (block 86). Any events having a time compression factor greater than the predetermined value are not identified as being time compressed and any events having a time compression factor equal to or less than 0.99 are identified as being time compressed. Events having a time compression factor equal to or less than 0.99 are identified as being time compressed because minor content corruptions resulting in loss of data frames may cause a data set to have a compression factor less than 1.0 even when no time compression has occurred. Thus, using a time compression value that is a small, finite amount less than 1.0, e.g., 0.99, helps to minimize the likelihood that such minor corruptions are erroneously counted as being associated with time compressed programming. As will be appreciated by one having ordinary skill in the art, use of a time compression value other than 0.99 may be suitable for some systems depending on how much corruption is encountered in such systems. In any event, testing may be performed on the system to determine a suitable value.

After determining whether time compression has occurred for a given time segment, the next, consecutive thirty-minute segment is analyzed (block 80), provided that additional events remain in the predetermined time period (block 82).

At any point in the above-described process, when it is determined that all time segments in the predetermined period have been analyzed (block 82), the computer 48 may prepare a report 52 indicating occurrence or nonoccurrence of time compression for any of the content received in the predetermined period by the monitoring station 28 of interest (block 90). Specifically, if all segments of a particular programming content have been identified as being time compressed, then the computer 48 may report that the programming content has been time compressed. Likewise, if at least one of the segments of the programming content is not time compressed, then the computer 48 may report that the programming content has not been time compressed.

As will be appreciated by one having ordinary skill in the art, the number of detected time compressed segments required to report that a programming content has been time compressed may vary depending on whether the system operators prefer to take a conservative or liberal approach. For example, the approach described above requires that all segments of a programming content be time compressed before the content is reported as being time compressed. Thus, this approach errs on the side of under reporting time compression. If instead, a more liberal approach is desired, then the computer may be configured to report that a programming content is time compressed provided that at least one or more of the segments of the content have been time compressed. Similarly, any percentage of time compressed segments may be used as a threshold for determining when a programming content shall be identified as having been time compressed, such that if the percentage of time compressed segments exceeds the threshold, then the associated programming content is reported as having been time compressed. In one embodiment, the number of time compressed segments required to report that the programming content has been time compressed may be determined based on the nature of time compression techniques used by broadcasters. For example, if it is known that the broadcasters compress all segments associated with a programming content or none of the segments, then the computer may be designed to report that a programming content has been time compressed upon detecting only a single time compressed segment. Likewise, if it is known that a broadcaster compresses some segments but not all, then the computer may be designed to report that a programming content has been time compressed when a threshold percentage of time compressed segments have been detected.

It should be understood that various changes and modifications to the embodiments described herein will be apparent to those skilled in the art. Such changes and modifications can be made without departing from the spirit and scope of the present invention and without diminishing its intended advantages. It is therefore intended that such changes and modifications be covered by the appended claims.

Various features of the invention are set forth in the appended claims.

What is claimed is:

1. Apparatus for detecting time compression of broadcast content having encoded time information, said apparatus comprising:
   a processor for comparing a first duration of time, the first duration of time being calculated using a set of encode times included in the encoded time information to a second duration of time associated with the broadcast of the content;
   wherein time compression of the content is determined to have occurred when said second duration of time is shorter than said first duration of time.

2. The apparatus as defined in claim 1, wherein said processor compares said first duration of time to said second duration of time by dividing said second duration of time by said first duration of time to obtain a compression factor, and time compression is determined to have occurred when said compression factor is less than a predetermined value.

3. The apparatus as defined in claim 2 wherein said predetermined value is approximately 1.0.

4. The apparatus as defined in claim 1 further including at least one tuner for receiving a broadcast signal carrying the content, and a controller for controlling the tuner to tune to said broadcast signal, extracting the encode times from the content as the content is received by the tuner, and recording a set of broadcast times, each broadcast time corresponding to one of the encode times, wherein said broadcast times are used to calculate the second duration of time.

5. The apparatus as defined in claim 4 further including means for transferring said encode times and said broadcast times to a buffer for storing data.

6. The apparatus as defined in claim 4, wherein said processor uses at least two of the broadcast times to calculate the second duration of time, the second duration of time being a duration of time during which the content was broadcast.

7. The apparatus as defined in claim 1, wherein said content comprises a television program and wherein said television program is divided into consecutive segments, and further wherein the processor processes each segment to detect whether time compression has occurred for each segment.

8. The apparatus as defined in claim 7, wherein the processor processes each segment by calculating the first duration for each segment and calculates the second duration for each segment and then compares the first and second durations calculated for each segment to determine whether time compression has occurred.

9. The apparatus as defined in claim 7, wherein each consecutive segment is separated by one or more commercial advertisements and wherein the apparatus is configured to identify the commercial advertisements and to exclude such commercial advertisements from the processing performed to detect whether time compression has occurred.

10. The apparatus as defined in claim 8, wherein the processor identifies said content as being time compressed if time compression is detected for all consecutive segments of said content.

11. The apparatus as defined in claim 7, wherein said content is encoded with identification information, and wherein said apparatus uses said identification information to identify all of the segments of the content.

* * * * *